(12) United States Patent
Deshmukh (10) Patent No.: US 9,015,222 B2
(45) Date of Patent: Apr. 21, 2015

(54) METHOD AND SYSTEM FOR MANAGING ONE OR MORE PROCESSES IN A BUSINESS CENTER

(75) Inventor: Gaurav Deshmukh, Maharashtra (IN)

(73) Assignee: Edgeverve Systems Limited (IN)

( * ) Notice: Subject to any disclaimer, the term of this patent is extended or adjusted under 35 U.S.C. 154(b) by 1426 days.

(21) Appl. No.: 12/562,535

(22) Filed: Sep. 18, 2009

(65) Prior Publication Data
US 2010/0077042 A1 Mar. 25, 2010

(30) Foreign Application Priority Data
Sep. 24, 2008 (IN) ............... 2327/CHE/2008

(51) Int. Cl.
  *G06F 15/16* (2006.01)
  *G06Q 10/06* (2012.01)
  *H04L 12/24* (2006.01)

(52) U.S. Cl.
  CPC ............ *G06Q 10/06* (2013.01); *G06Q 10/0633* (2013.01); *G06Q 10/06398* (2013.01); *H04L 41/5032* (2013.01); *H04L 41/50* (2013.01)

(58) Field of Classification Search
  CPC .... H04L 41/50; H04L 41/5032; G06Q 10/06; G06Q 10/06398; G06Q 10/0633
  See application file for complete search history.

(56) References Cited

U.S. PATENT DOCUMENTS

| | | | |
|---|---|---|---|
| 6,882,723 B1 | 4/2005 | Peterson et al. | |
| 8,380,648 B2 * | 2/2013 | Matson et al. | 706/47 |
| 2003/0078782 A1 * | 4/2003 | Blair | 704/270.1 |
| 2003/0090514 A1 * | 5/2003 | Cole et al. | 345/744 |
| 2005/0015279 A1 * | 1/2005 | Rucker | 705/2 |
| 2005/0240763 A9 * | 10/2005 | Bhat et al. | 713/169 |
| 2006/0026049 A1 | 2/2006 | Joseph et al. | |
| 2006/0112126 A1 | 5/2006 | Soto et al. | |

FOREIGN PATENT DOCUMENTS

WO 0079350 12/2000

* cited by examiner

*Primary Examiner* — Thomas Dailey
*Assistant Examiner* — Nam Tran
(74) *Attorney, Agent, or Firm* — Cantor Colburn LLP (57) ABSTRACT

The present invention provides a system and a method for managing a customer contact center. The system includes a one click sign-in module, a client-host, and a control module. The one click sign-in module enables one-click authentication of an agent for logging in to a plurality of applications during a data transaction. The client-host displays the plurality of applications to the agent on a single screen to enable access to critical information related to the data transaction from the plurality of applications. Further, the control module records the critical information of the data transaction for data analysis to manage one or more processes related to the data transaction.

29 Claims, 10 Drawing Sheets

METHOD AND SYSTEM FOR MANAGING ONE OR MORE PROCESSES IN A BUSINESS CENTER

BACKGROUND

The present invention relates to the field of business processes. More specifically, the present invention relates to managing business processes in a business process center.

In business process centers, a business process is a sequence of operational activities which are followed by various individuals to achieve a particular business goal. Further, the operational activities are often manual activities which are executed by individuals, also known as agents. These agents play various roles in the business with respect to customers and other business partners.

Business processes are generally categorized as back office and front office processes. Front office business processes include various customer service activities such as sales, marketing, tech support, answering customer queries, and the like. The customers connect with the business process center through telephone, email, Interactive Voice Response (IVR), web callback, Internet chat, and the like. Similarly, back office processes include business activities such as order processing, fault clearance, and the like.

Presently, business processes are widely enabled by Information Technology Enabled Services (ITES). Various software applications are developed to carry out the business processes in an efficient manner. Further, the software applications are changed/modified regularly on the basis of the requirements of the business. Thereafter, integration of the modified software applications with the existing applications corresponding to the business processes is done by the IT department of the client of the business process center. Further, prior to the integration, the software applications need to pass through various Software Development Life Cycle (SDLC) phases. Consequently, this process increases the time required to integrate the applications, and moreover, changing the existing applications accordingly also consumes a considerable amount of time.

Existing business process centers use software applications that have various redundant features such as manually inputting various data items to carry out various tasks, and separately entering log-in credentials related to each of the software applications to execute the processes. Such redundant tasks decrease the interest of the agent towards work, thereby decreasing the efficiency and increasing the attrition rate. Further, in major business process centers the agents are trained on various applications independently. Therefore, this increases the stress levels of the agents to remember the use, need and functionality of each of the applications. Furthermore, the business process centers fail to provide effective Management Information System (MIS). Therefore, it is very difficult to track the activities of the agents, for example, the agents not reporting to the office at the right time.

In light of the above discussion, there is a need for a method and a system for enabling easy integration of new/modified applications with the existing applications, and thereby making the integration a technology independent process. Further, the method and system should provide an easy and efficient authentication mechanism to automate the redundant activities and also facilitate training on the applications concurrently, thereby increasing the productivity and efficiency. Furthermore, there should be efficient tracking of the various activities that is performed by the agent in the business process center.

SUMMARY

An object of the invention is to provide a system for managing one or more processes in a business process center.

Another object of the invention is to provide a method for building an efficient authentication mechanism to a plurality of applications corresponding to one or more processes in a business process center.

Yet another object of the invention is to provide a method for tracking events in a business process center.

To achieve the objectives mentioned above, the invention provides a system, method and computer program product for managing one or more processes in a business process center. The system includes a one click sign-in module, a client-host and a control module. The one click sign-in module enables one-click authentication of an agent to log in to a plurality of applications during a data transaction. The client-host displays the plurality of applications on a single screen to enable access to critical information related to the data transaction to the agent from the plurality of applications. Further, the control module records the critical information related to the data transaction for data analysis to manage one or more processes associated with the data transaction.

The system and method described above have several advantages. The invention eliminates the requirement of individual sign in to the applications involved in the data transaction. Further, the system excludes redundant tasks that need to be performed by the agent. Therefore, this helps in increasing the productivity and efficiency of the business process center, and subsequently decreases its attrition rate. Further, since the system directly accesses the applications from the server, it eliminates the need for changing the system on the basis of the changes made to the existing applications. The invention is adjustable to various applications irrespective of their underlying technology. Furthermore, the system integrates various applications on a single screen, thereby helping the agent to perform more efficiently and enabling effective handling of the call. Also, integrating various applications on the single screen helps effective training since all the applications are readily available for a trainer. The system also enables real time event capturing that may be used for productivity improvements and operations management.

BRIEF DESCRIPTION OF THE DRAWINGS

Various embodiments of the invention will hereinafter be described in conjunction with the appended drawings, provided to illustrate and not limit the invention, wherein like designations denote like elements, and in which.

DETAILED DESCRIPTION OF DRAWINGS

The invention describes a method and a system for managing one or more processes in a business process center. The business process center employs one or more agents to resolve customer-related problems and queries during a data transaction. The invention aggregates and displays the data related to the customers on a single display screen to the agent, and provides the agent with easy access to the information needed to successfully and efficiently help the customer.

Figure 1:
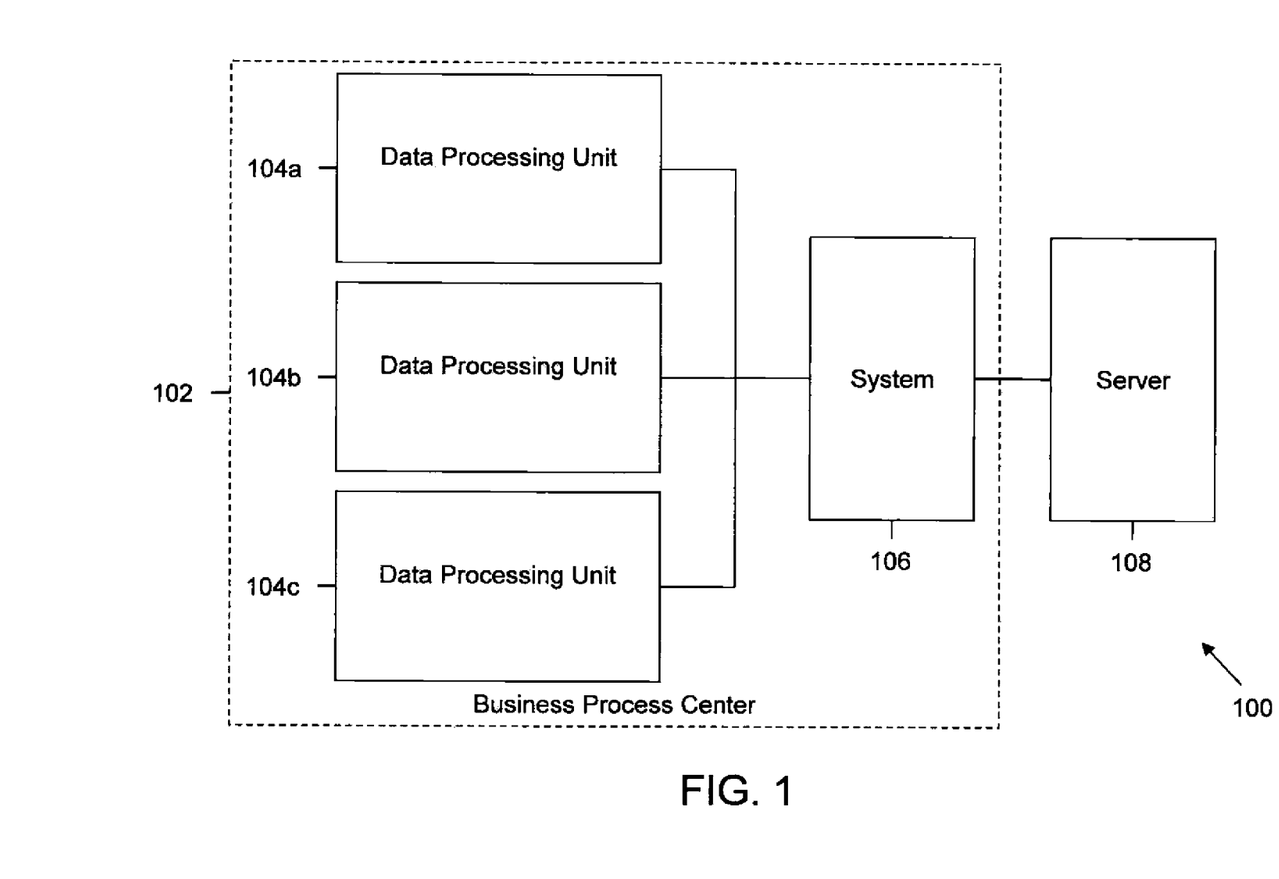
FIG. 1 is a block diagram of a solution framework in which various embodiments of the present invention may be practiced.

FIG. 1 is a block diagram of a solution framework 100 in which various embodiments of the present invention can be practiced.

Solution framework 100 includes a business process center 102 and a server 108. Business process center 102 includes various data processing units, such as a data processing unit 104a, a data processing unit 104b, and a data processing unit 104c, hereinafter referred to as data processing unit 104; and a system 106. Each data processing unit 104 can access system 106 through a network. In various embodiments of the invention, data processing unit 104 can be a computer, a laptop, a Personal Digital Assistant (PDA), a mobile device, and the like.

Various embodiments of the invention are suitable for the requirements of a first organization that redirects/outsources its work to a second organization, which operates through business process centers such as business process center 102. For example, the first organization can be a telecom service provider or an overseas bank, outsources its customer care process to the second organization. It may be apparent to any person skilled in the art that the first organization outsources/ redirects its work to obtain cost advantage. Various examples of business process center 102 include, but are not limited to, a customer contact center, a call center, and the like.

An agent accesses system 106 through data processing unit 104 to address various concerns of a customer. In an embodiment of the invention, system 106 may be installed on data processing unit 104, which is being used by the agent. System 106 enables resolution of the concerns and provides the required output, based on information related to a data transaction. In an embodiment of the invention, the data transaction may be a voice process, also known as a front office process, or a data process, also known as a back office process. An example of a voice process can be a customer making a call to business process center 102 to check if there is an outage in an area, to check the billing information, and the like. An example of a data process can be a query related to the bandwidth of a network that is allotted to a customer by the internal technical staff of the first organization. To elaborate on this, if there is a problem related to the bandwidth of a network assigned to a customer, it may not be in the capacity of the agent to rectify the problem. Therefore, the agent generates a ticket upon receiving the call from the customer, which is sent to the technical team for the resolution of the problem. This ticket is thereafter considered as a data transaction, and is executed using system 106. In an embodiment of the invention, the technical team can be employed by the second organization.

In an embodiment of the invention, system 106 is implemented by the means of a Server Query Language (SQL) server. System 106 enables concurrent management of various processes through the applications associated with the data transaction. Examples of the applications include, but are not limited to, account management applications, billing applications, product management applications, process flows applications, SLA trackers, knowledge base applications, soft phones, intranet, chat applications, ticket managers, and line tests. In various embodiments of the invention, the applications or the URLs of the applications, which are web based, are stored at server 108. Further, management of the processes by system 106 is explained in detail in conjunction with FIG. 2, FIG. 3, FIG. 4, and FIG. 5.

In various embodiments of the invention, server 108 may be installed at the premises of the first organization or at the second organization. In an embodiment of the invention, the server is a Server Query Language (SQL) server. In an embodiment of the invention, system 106 is connected with server 108 through a network. Various examples of the network may be a Local Area Network (LAN), Wide Area Network (WAN), Wireless networks, Internet, intranet, and the like.

Figure 2:
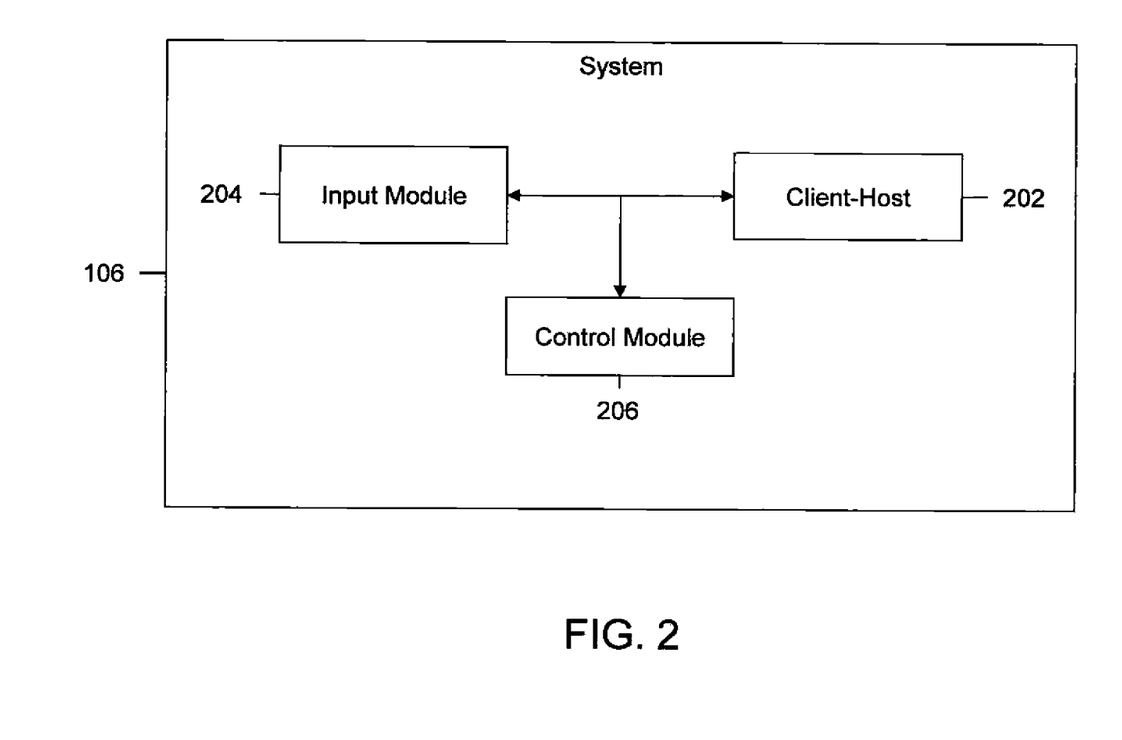
FIG. 2 is a block diagram of a system for managing one or more processes in a business process center, in accordance with an embodiment of the invention.

FIG. 2 is a block diagram of system 106 for managing one or more processes in business process center 102, in accordance with an embodiment of the invention. System 106 includes a client-host 202, an input module 204, and a control module 206.

As explained earlier, system 106 enables an agent to resolve/address a customer's concerns. Further, as mentioned above, a plurality of applications may be required to address a typical problem raised by the customer. In an embodiment of the invention, these applications are provided and updated by the first organisation, for example, a telecom service provider, and are stored in server 108. In another embodiment of the invention, these applications may be provided by the second organization at server 108 and are integrated with system 106. In various embodiments of the invention, the applications are accessed from a corresponding URL stored in server 108. In another embodiment of the invention, the applications are web-based applications, and their URLs are stored in server 108, which enables access to these applications.

Figure 9:
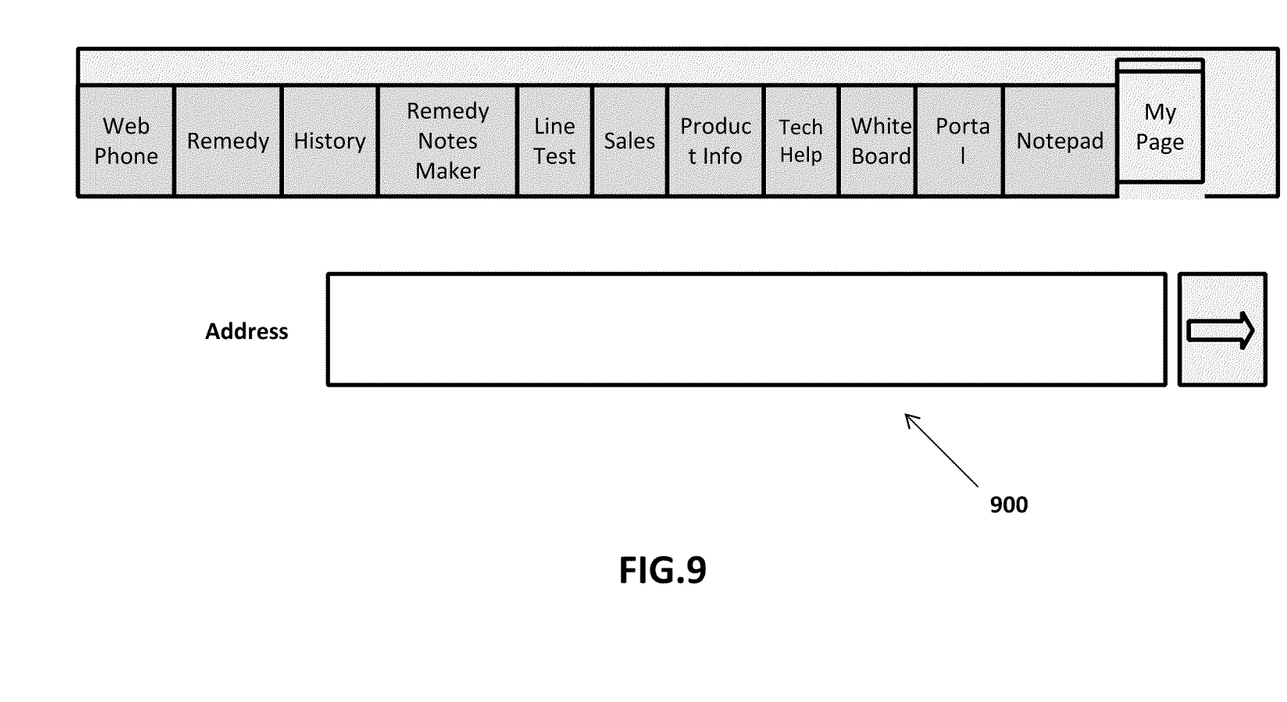
FIG. 9 depicts an exemplary snapshot of the plurality of applications in a tabbed view, in accordance with an embodiment of the invention.

Client-host 202 displays the plurality of applications to the agent on a single screen. In various embodiments of the invention, the single screen display may be enabled by client-host 202 in a tabbed view. The tabbed view provides a separate tab for each of the plurality of applications on the single screen. In an embodiment of the invention, the order of the tabs may be decided based on the agent's preferences and the usage of the applications. Further, FIG. 9 depicts an exemplary snapshot 900 of the plurality of applications in the tabbed view.

Client-host 202 enables seamless communication between the plurality of applications by linking them with each other. The plurality of applications is linked on the basis of the parameters that are common in them. For example, ZIP code, as used in an account information application, may be required in an application that specifies if there are any network issues corresponding to the ZIP code. Similarly, in a banking customer contact center, an account number can be common between a savings account application and a loan application, and therefore, can be used to link these applications.

Upon the initiation of a data transaction, the agents may select an application by clicking on one of the tabs corresponding to the application. Each of the plurality of applications may correspond to some critical information related to the customer or the data transaction. In various embodiments of the invention, the agent is provided access to the critical information by displaying the critical information on the single screen. The display of the critical information enables the agent to select the appropriate application to process the data transaction. In an embodiment of the invention, the critical information may correspond to the details related to the customer.

In an embodiment of the invention, the critical information is a set of information that is required by an agent to process the data transaction, for example, answering a call. In another embodiment of the invention, the critical information is a set of information that is required by the technical team to resolve a case. Various examples of the critical information include, but are not limited to, ZIP code, weather information, the address of the customer, time zone, pronunciation styles in a particular language, and the like. It may be apparent to any person skilled in the art that the call is associated with the voice process and the case is associated with the data process. In an embodiment of the invention, the critical information is identified from various applications associated with the data transaction. It may be apparent to any person skilled in the art that the critical information to be displayed to the agent can be customized according to the needs of business process center 102. Further, the functions of client-host 202 are described in detail in conjunction with FIG. 4.

Input module 204 enters one or more pre-defined data items in at least one of the one or more applications. These pre-defined data items are required for the data transaction. For example, in a customer contact center of an overseas bank, the account numbers corresponding to the customers is a pre-defined data item that is required to be entered in the applications, for example, savings account application, loan application, and retirement policy application. Similarly, in order to monitor the performance of few companies at the stock exchange, input module 204 may enter the list of the companies in the corresponding applications at a pre-defined time interval. In an embodiment of the invention, input module 204 enters the pre-defined data in web pop ups and windows pop ups, which are invoked when the applications are accessed. In an embodiment of the invention, the pre-defined data items can be pre-programmed by the agent. In another embodiment of the invention, the pre-defined data items can be provided by the agent in the real time.

Figure 10:
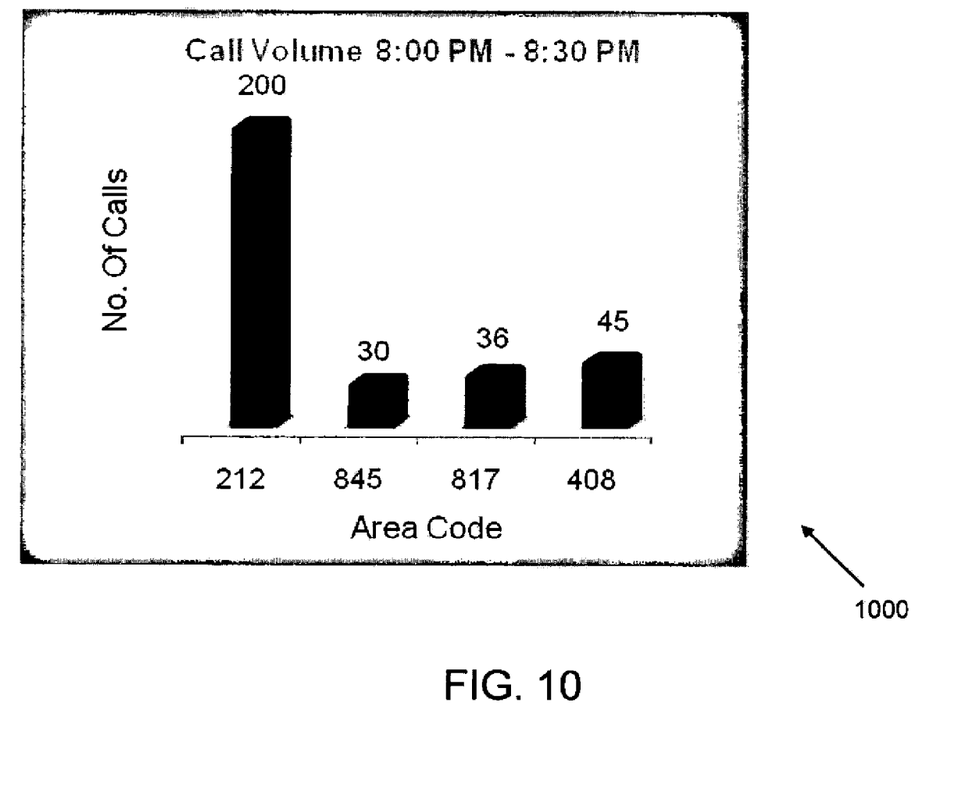
FIG. 10 is a snapshot depicting an exemplary representation generated by a control module, in accordance with an embodiment of the invention.

Control module 206 records the critical information and the details related to the data transaction for data analysis. Various examples of the details include, but are not limited to, tracking of the key strokes performed by the agent, call details, case details, application events, behavior of the agent, the information provided by the applications, and the like. These details are used for the data analysis. For example, the time spent by the particular agent in resolving a problem can be constantly monitored for a predefined time. Similarly, the number of calls made from a specific area can be monitored. Such details enable efficient management of the processes. For example, the time spent by the agent can reflect the productivity of the agent, and the numbers of calls may reflect the number of concerns/issues that are faced by the customers in a particular area. In various embodiments of the invention, such data analysis is represented in the form of charts, tables, reports, and the like, to a reviewer. Further, FIG. 10 depicts an exemplary bar graph generated by control module 206.

In an embodiment of the invention, the reviewer may be a project lead, an agent, a supervisor, a process manager, a quality manger, and the like. Further, the functionalities of control module 206 are described in detail in conjunction with FIG. 5.

Figure 3:
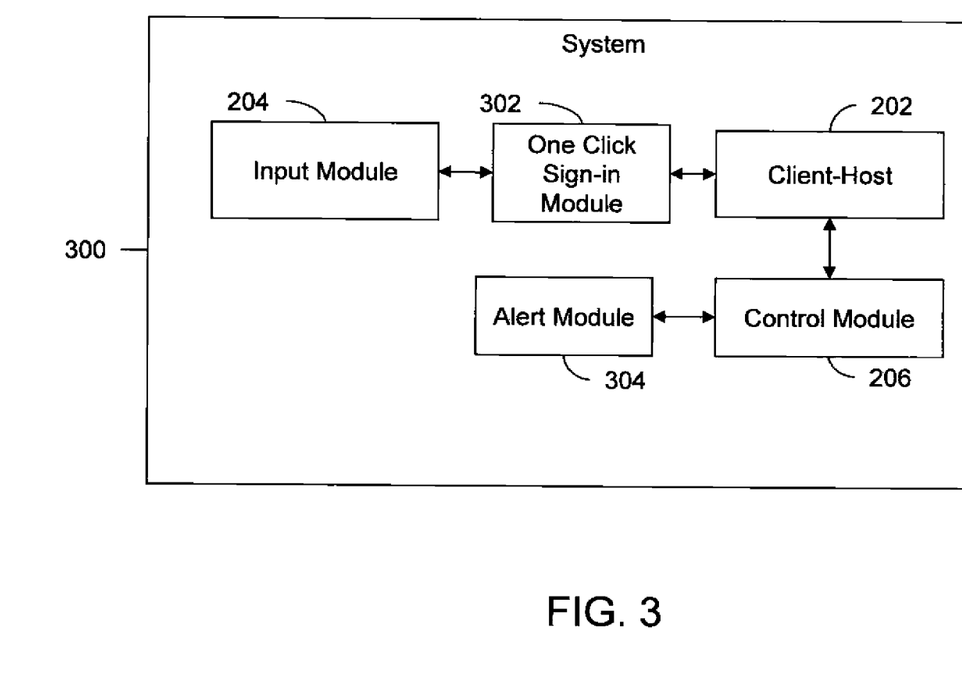
FIG. 3 is a block diagram of a system for managing one or more processes in a business process center, in accordance with another embodiment of the invention.

FIG. 3 is a block diagram of a system 300 for managing one or more processes in business process center 102, in accordance with another embodiment of the invention. System 300 includes a client-host 202, an input module 204, control module 206, a one click sign-in module 302, and an alert module 304. To describe system 300, references will be made to FIG. 2, although it is understood that system 300 can be implemented with reference to any other suitable embodiment of the invention.

As explained earlier in FIG. 2, client-host 202 displays the applications to the agent on a single screen. The applications are required to address a typical problem raised by the customer. In various embodiments of the invention, various applications contain their corresponding log-in credentials of the agents. For example, an account management application may have log-in credentials for an agent, which may be different from that in a billing application.

One click sign-in module 302 enables one-click authentication of the agent to log in to a plurality of applications. The plurality of applications is associated with the data transaction. As explained earlier, different log-in credentials are required for each software application. In an embodiment of the invention, these different log-in credentials are mapped to a single log-in credential of the agent. In an embodiment of the invention, the log-in credential used by the agent for accessing the operating system of data processing unit 104 may be used as the single log-in credential of the agent for accessing the applications. In an embodiment of the invention, different log-in credentials are entered in the respective applications by input module 204 corresponding to the single login credential of the agent. Further, various login credentials associated with the various applications are stored in server 108.

Mapping of the various log-in credentials related to the various applications corresponding to the log-in credential of the agent is maintained in system 106. In an embodiment of the invention, the log-in credential of the agent and the multiple log-in credentials corresponding to the various applications can be assigned by a system administrator. In another embodiment of the invention, the log-in credential of the agent and the multiple log-in credentials corresponding to the various applications can be assigned by the agent.

Therefore, the log-in credential of the agent provided to one click sign-in module 302 is mapped with the corresponding log-in credentials of the applications and the agent can sign in to the various applications by using single log-in credentials. Other functionalities of one click sign-in module 302 are described in detail in conjunction with FIG. 4.

In an embodiment of the invention, control module 206 captures the information related to the agent. The information may be personal or official. Further, based on the information captured by control module 206, the agent may be prompted while signing in through one click sign-in module 302. For example, if the agent does not report to the office for consecutive fours days, then on the fifth days, when the agent tries to log in, one click sign-in module prompts him/her to change the password. In various embodiments of the invention, the information captured helps in efficiently managing the processes in business process center 102.

Alert module 304 enables a reviewer to send a common message, also referred to as an alert, to various agents that are connected through system 108. The reviewer may be a project manager, a team lead, and the like. For example, the reviewer may want to send a common message, for example, 'Let's meet in a meeting room 'alpha' at 4 p.m. today'. Such messages are displayed to all the agents.

Figure 4:
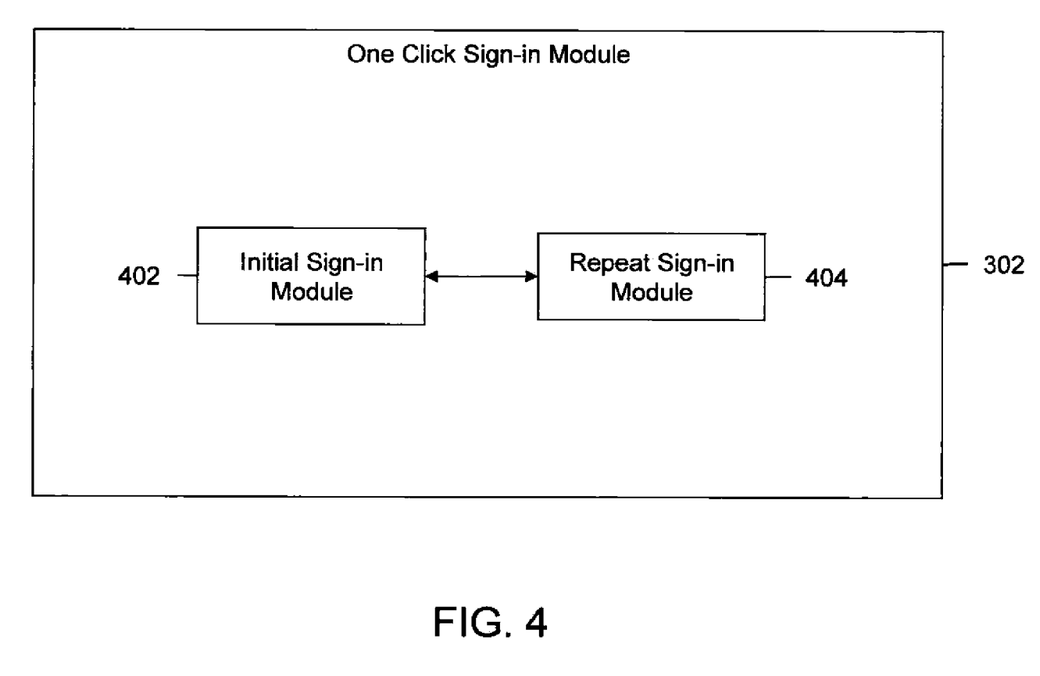
FIG. 4 is a block diagram of a one click sign-in module for one-click authentication of an agent for accessing a plurality of applications, in accordance with an embodiment of the invention.

FIG. 4 is a block diagram of one click sign-in module 302 for one-click authentication of an agent to access a plurality of applications, in accordance with an embodiment of the invention. One click sign-in module 302 includes initial sign-in module 402 and repeat sign-in module 404.

Initial sign-in module 402 is configured to enable initial one-click authentication by identifying the log-in credential of the agent. As explained earlier, the log-in credential of the agent is mapped with the different log-in credentials associated with the various applications.

Repeat sign-in module 404 enables one click authentication when the log-in sessions of one or more applications of the plurality of applications expire. In various embodiments of the invention, one or more applications of the plurality of applications use log-in sessions to monitor the duration of activity between the agent's logging in and the idle time. In an embodiment of the invention, the applications may disable the existing log-in sessions, if there is no activity by the agent on these applications for a specified time period. Repeat sign-in module 404 enables one-click authentication to the plurality of applications for re-log in on the expiration of the session.

Figure 5:
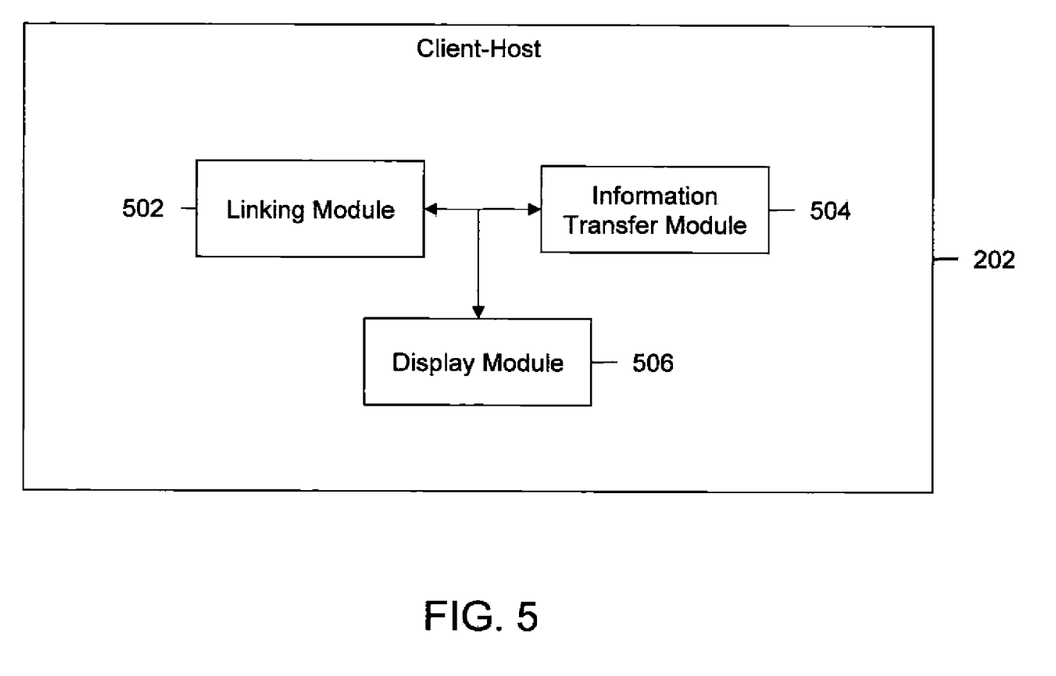
FIG. 5 is a block diagram of a client-host configured to display the plurality of applications in a single screen, in accordance with an embodiment of the invention.

FIG. 5 is a block diagram of client-host 202 configured to display the plurality of applications on a single screen, in accordance with an embodiment of the invention. Client-host 202 includes a linking module 502, an information transfer module 504, and a display module 506.

Client-host 202 displays the plurality of applications to the agent on a single screen. Linking module 502 creates an interface among the plurality of applications. In various embodiments of the invention, the interfaced applications are displayed in a tabbed view to the agents on the single screen. Further, the plurality of applications is linked on the basis of one or more parameters that are common among the applications. For example, ZIP code, which is present in 'the accounting information application', may also be present in 'the outage application'. In an embodiment of the invention, in order to improve the productivity, the order of the tabbed applications is decided on the basis of the preferences of the agent. In another embodiment of the invention, the order of the tabbed applications is decided on the basis of the usage of each of the plurality of applications.

Information transfer module 504 is configured to enable communication among the plurality of applications. In various embodiments of the invention, the communication includes transmitting critical information from the plurality of applications on the single screen. The plurality of applications may be developed by using various technologies such as Web, Mainframe, UNIX, Microsoft Technologies, and the like. Information transfer module 504 enables seamless communication across the network and among such heterogeneous applications. For example, the information generated by a first application, for example, the area code of the customer who is calling from a particular area is captured by information transfer module 504 and is passed to a second application, for example, the outage application. Therefore, the agent can directly check whether there is any outage in the area code corresponding to the customer's area code. The second application may further use this information to provide more details to the agent.

Display module 506 is configured to display the critical information to the agent. In various embodiments of the invention, the critical information is captured from the plurality of applications. Further, in various embodiments of the invention, the critical information is captured from various sources, such as Interactive Voice Response system, historic data, world clock, a data entry made by the agent, applications, and so forth, and is transferred to display module 506 by information transfer module 504. The critical information may be viewed by the agent for the entire duration of the call or while processing the case. This information is critical for the agent to quickly resolve the case/issue. Display module 506 also enables the agent to quickly navigate to a desired application by hyper linking the critical information with the corresponding tabs. In an embodiment of the invention, the critical information is also shown with various tabs to the agent. Further, each such tab is hyper linked to the corresponding application which helps the agent to easily navigate between the applications.

Figure 6:
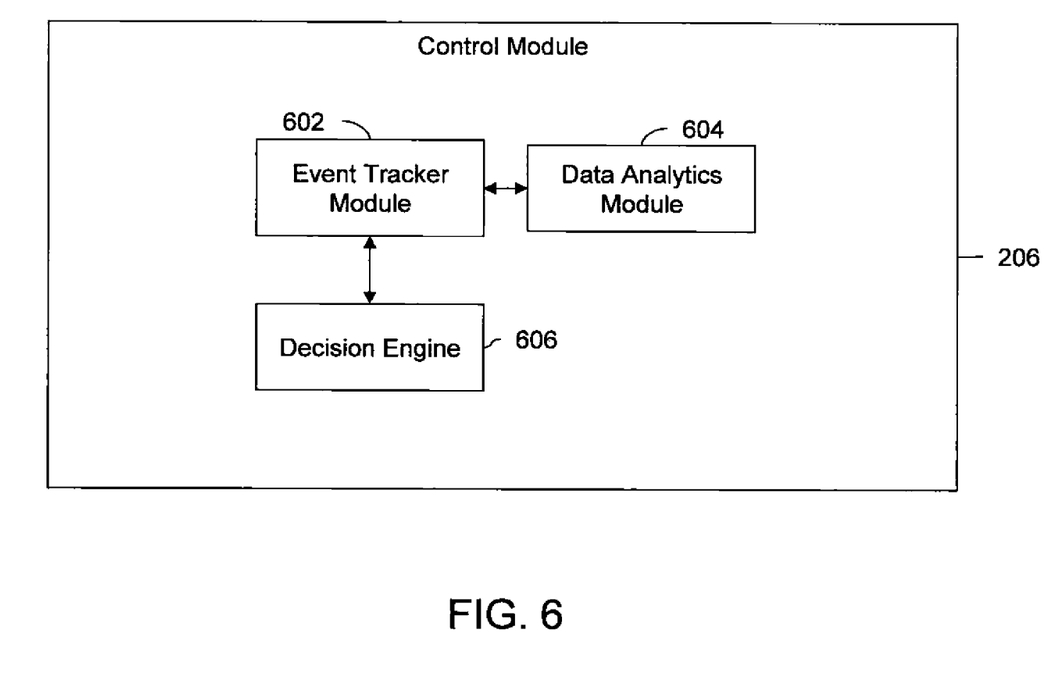
FIG. 6 is a block diagram of a control module configured for recording critical information and one or more details related to a data transaction for data analysis, in accordance with an embodiment of the invention.

FIG. 6 is a block diagram of control module 206 configured to record the critical information and one or more details related to a data transaction for data analysis, in accordance with an embodiment of the invention. Control module 206 includes an event tracker module 602 and a data analytics module 604.

Event tracker module 602 is configured to capture various events that occur during a data transaction. Various examples of the events include, but are not limited to, key strokes used by the agent, incoming call/case details, events associated with the applications, and the like. Event tracker module 602 records each minute detail of the call or the case that is being handled by the agent. In various embodiments of the invention, the details include the time required to resolve the case, type of the case, quality of the service, standardization methods followed by the agent, solution provided to the customer, and the like. The information captured by event tracker module 602 is stored in server 108 and used for data analytics. Event tracker module 602 is also configured to display the critical information to one or more process managers in business process center 102. In an embodiment of the invention, SQL Server Reporting Services (SSRS) is used to display real time information to supervisors and operations managers in the business process center 102. Event tracker module 602 identifies if the agent is busy in handling a data transaction, and can also extract the duration of the data transaction. In an embodiment of the invention, event tracker module 602 monitors the break-time schedule for the one or more agents to determine if the agents are adhering to the schedule defined by Resource Management Groups (RMG) in the business process center 102. This information may also be displayed in the form of a graphical view to the supervisors, quality managers, process managers, team leads, operation managers, and the like. In an embodiment of the invention, the events are monitored and stored in server 108.

In another embodiment of the invention, event tracker module 602 enables the agent to make notes corresponding to a case/call. Various process steps are provided to the agents, which can be used for making notes. The agent can click on a step to ascertain if this step has been followed, and it automatically gets recorded in the notes. Therefore, notes corresponding to each case/call are recorded, which can be later used for the analysis of the data.

Data analytics module 604 is configured to perform data analysis on the recorded critical information. Various examples of the data analysis include resource management analysis, real time area code trends analysis, and the like. In an embodiment of the invention, the critical information captured by event tracker module 602, such as area code of the telephone number of the case, is used to prepare real time trends of the call or data transaction volume. This information is used for data analytics and also to identify any possible outage of certain services in a particular area. Further, the number of agents who are not adhering to the time schedule can be represented in the form of charts to one or more managers. In various embodiments of the invention, the representation can be in the form of charts, tables, graphs, and the like.

In another embodiment of the invention, data analytics module 604 represents the data extracted based on the pre-defined items entered by input module 204. Following the example mentioned in FIG. 2, data analytics module 604 represents the information related to stocks such as stock prices, variations and trends in the stock prices, and the like, to the agent.

In yet another embodiment of the invention, data analytics module 604 represents the data present in the various applications. For example, based on the ZIP code of a customer, data analytics module 604 represents the weather information related to the area of the customer to the agent.

Decision engine 606 makes a decision on the basis of the event tracked by event tracker module 602. For example, if it is determined, based on the events tracked by the event tracking module 602, that there is an outage in a particular area, based on the calls received by the agents, then decision engine 606 can be pre-programmed to send a common message to the agents through alert module 304. This may enable an agent to know the context in advance and will help the agent to handle calls efficiently.

Figure 7:
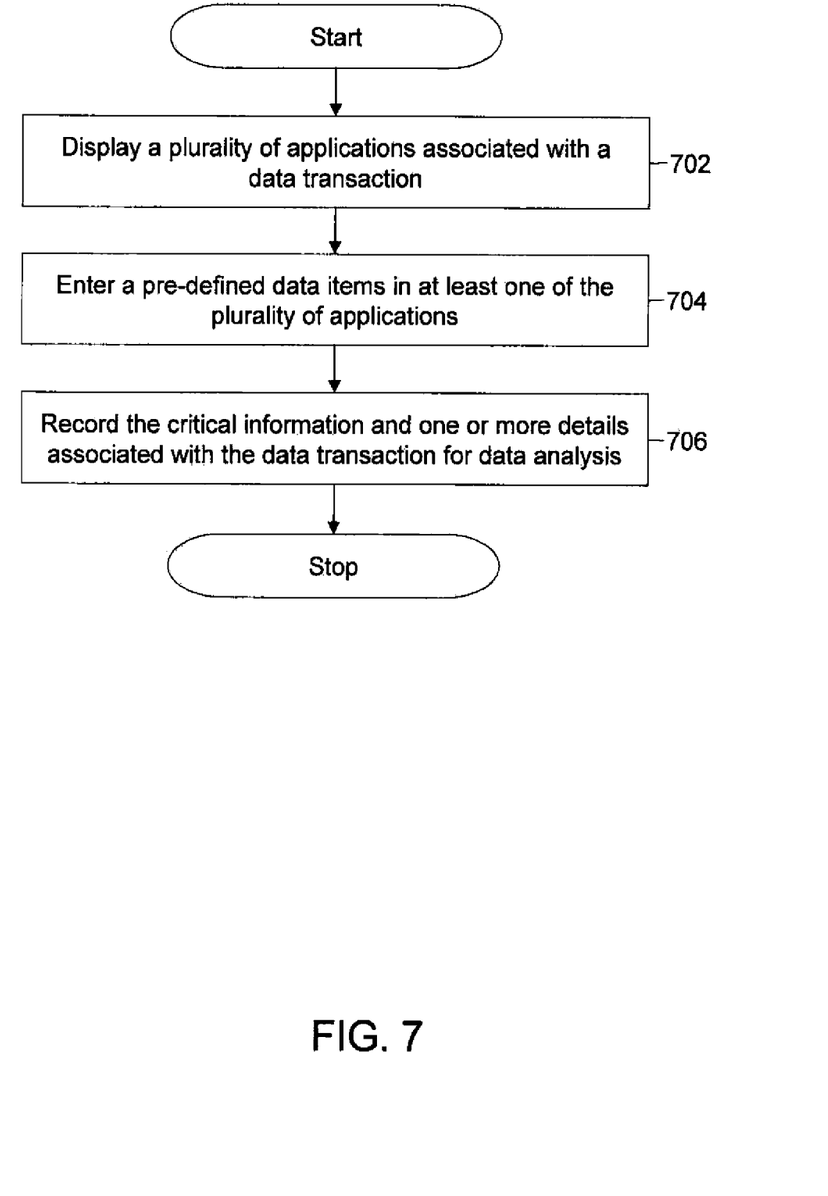
FIG. 7 illustrates a flowchart for a method for managing one or more processes in a business process center, in accordance with an embodiment of the invention.

FIG. 7 illustrates a flowchart for a method for managing one or more processes in a business process center, in accordance with an embodiment of the invention.

In various embodiments of the invention, a business process center employs various agents for addressing customer-related concerns. Various examples of the business process center include, but are not limited to, a customer contact center, a call center, and the like. For example, a telecom service provider may have a business process center for addressing concerns of its customers. These agents work on various applications that are associated with a data transaction. As explained earlier, data transaction can be a voice process or a data process. The details of the data transaction are explained in conjunction with FIG. 2. Various examples of the applications include account management applications, billing applications, product management applications, process flows applications, SLA trackers, knowledge base applications, soft phones, intranet, chat applications, ticket managers, and line tests.

At step 702, the applications are displayed on a single screen to an agent processing a data transaction. In various embodiments of the invention, the single screen display may be enabled in a tabbed view. The tabbed view provides a separate tab for each of the plurality of applications on the single screen and links the plurality of applications with each other.

In an embodiment of the invention, the applications are linked on the basis of one or more parameters that are common in the various applications. For example, ZIP code, as used in an account information application, may also be required in an application that specifies if there are any network issues corresponding to the ZIP code. Similarly, in a banking customer contact center, an account number can be common between a saving account application and a loan application, and therefore, can be used for linking these applications.

Each of the plurality of applications may correspond to some critical information related to the customer or the data transaction. In various embodiments of the invention, the agent is provided access to the critical information by displaying the critical information on the single screen. The display of the critical information enables the agent to select the appropriate application to process the data transaction. In an embodiment of the invention, the critical information may correspond to the details associated with the customer. The critical information is explained in detail in conjunction with FIG. 2.

In an embodiment of the invention, the applications are accessed through their URLs that are stored in a server such as server 108. At step 704, one or more pre-defined data items are entered in at least one of the one or more applications. These pre-defined data items are required for the data transaction. For example, in a customer contact center of an overseas bank, the account numbers corresponding to the customers is a pre-defined data item that is required to be entered in all the applications, such as a savings account application, a loan application, and a retirement policy application. Similarly, in order to monitor the performance of few companies at the stock exchange, the names of those companies need to be entered in the corresponding applications at a predefined time interval. In an embodiment of the invention, the pre-defined data can also be entered in web pop ups and windows pop ups, which are invoked when the applications are accessed.

At step 706, the critical information and one or more details related to the data transaction is recorded for data analysis. The data analysis based on the details and critical information is displayed to the agent in the form of charts, tables, graphs, and the like. In various embodiments of the invention, the data analysis enables effective management of one or more processes related to the data transaction. The data analysis corresponding to the data transaction is explained in detail in conjunction with FIG. 2.

Figure 8:
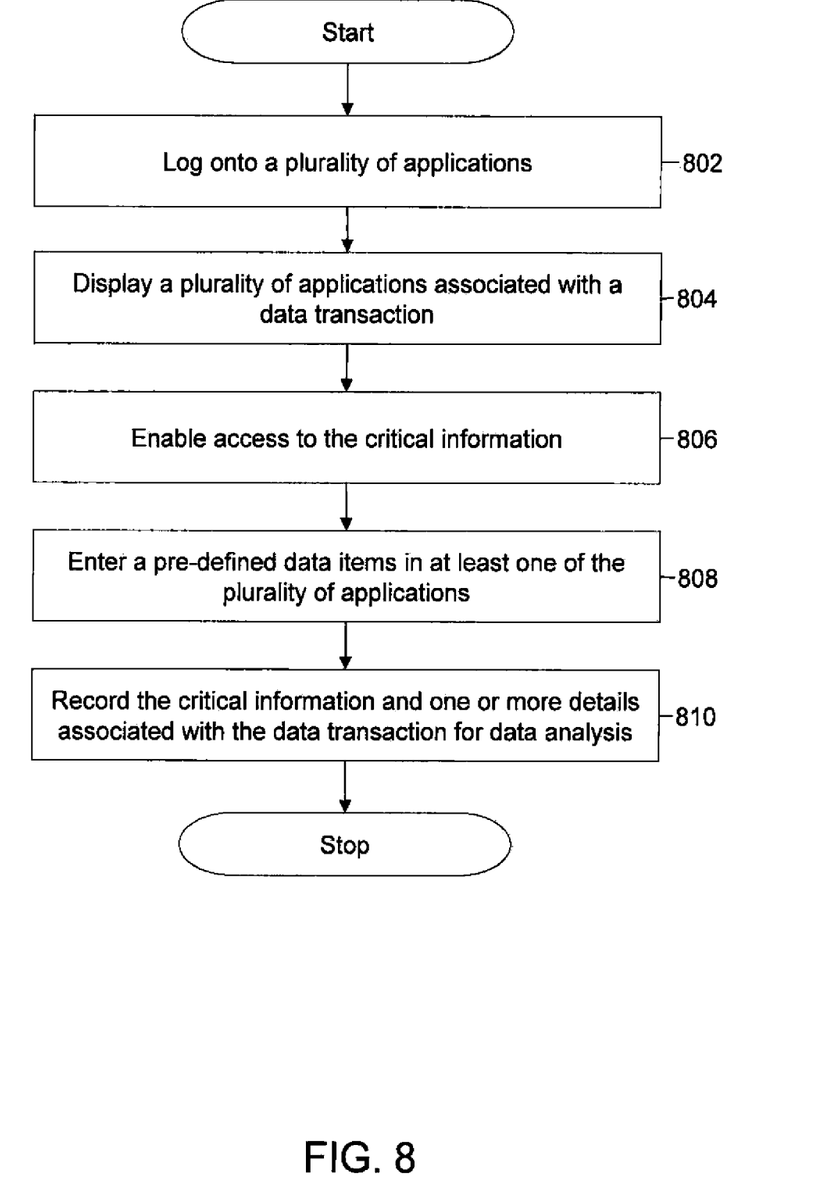
FIG. 8 illustrates a flowchart for a method for managing one or more processes in a business process center, in accordance with another embodiment of the invention.

FIG. 8 illustrates a flowchart for a method for managing one or more processes in a business process center, in accordance with another embodiment of the invention.

As explained earlier in FIG. 7, there are various applications associated with a data transaction. In various embodiments of the invention, the various applications have their corresponding log-in credentials for the agents. For example, an account management application may have a log-in credential for an agent, which may be different from that in a billing application.

At step 802, an agent logs on to a plurality of applications related to the data transaction by using one-click authentication. As explained earlier, different log-in credentials are required for each application related to the data transaction. In an embodiment of the invention, these different log-in credentials are mapped to a single log-in credential of the agent. In an embodiment of the invention, the log-in credential used by the agent to access the operating system of a data processing unit, such as data processing unit 104, may be used as the single log-in credential of the agent to access the applications. Further, one-click authentication is explained in detail in conjunction with FIG. 3.

At step 804, on successful authentication, the applications related to the data transaction are displayed to the agent. In an embodiment of the invention, the applications are linked with each other on the basis of their common parameters. Further, the applications are displayed to the agent in a tabbed view. Linking of the various applications on the basis of the parameters is explained in detail in conjunction with FIG. 2 and FIG. 5.

At step 806, access to the critical information related to the data transaction is provided to the agent. In an embodiment of the invention, the critical information is required by an agent to process the data transaction, for example, answering a call. In another embodiment of the invention, the critical information is required by the technical team to resolve a case. Various examples of the critical information include, but are not limited to, ZIP code, weather information, the address of the customer, time zone, pronunciation styles in a particular language, and the like. In an embodiment of the invention, the critical information is identified from the various applications related to the data transaction.

At step 808, one or more pre-defined data items are entered in at least one of the one or more applications. These pre-defined data items are required for the data transaction. For example, in a customer contact center of an overseas bank, the account numbers corresponding to the customers is a pre-defined data item that is required to be entered in all the applications, such as savings account applications, loan applications, and retirement policy applications.

At step 810, the critical information and one or more details associated with the data transaction is recorded for data analysis. The data analysis based on the details and critical information is displayed to the agent in the form of charts, tables, graphs, and the like. For example, the average time spent by the agents in handling a call in different time intervals of the day can be represented in the form of a chart to a reviewer, such as a project manager, a project lead, and the like. Similarly various other charts can be represented on the basis of the details and the critical information. Different forms of the representation of the critical information and details are explained in detail in conjunction with FIG. 2 and FIG. 6.

FIG. 9 is a snapshot 900 depicting the various applications in a tabbed view. In snapshot 900, web phone, remedy, history, remedy notes maker, line test, sales, and the line test are a plurality of applications corresponding to a data transaction.

FIG. 10 is a snapshot 1000 depicting an exemplary representation. Snapshot 1000 depicts a bar graph representing outage in predefined area codes. For example, area code 212 according to snapshot 1000 has the maximum outage.

The system and method described above have several advantages. The invention eliminates the requirement of individual sign in to the applications involved in the data transaction. Further, the system excludes redundant tasks that need to be performed by the agent. Therefore, this helps in increasing the productivity and efficiency of the business process center, and subsequently decreases its attrition rate. Further, since the system directly accesses the applications from the server, it eliminates the need for changing the system on the basis of the changes made to the existing applications. The invention is adjustable to various applications irrespective of their underlying technology. Furthermore, the system integrates various applications on a single screen, thereby helping the agent to perform more efficiently and enabling effective handling of the call. Also, integrating various applications on the single screen helps effective training since all the applications are readily available for a trainer. The system also enables real time event capturing that may be used for productivity improvements and operations management.

The system for managing one or more processes in a business process center, as described in the present invention or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer further comprises a microprocessor, which is connected to a communication bus. The computer also includes a memory, which may include Random Access Memory (RAM) and Read Only Memory (ROM). The computer system also comprises a storage device, which can be a hard disk drive or a removable storage drive such as a floppy disk drive, an optical disk drive, etc. The storage device can also be other similar means for loading computer programs or other instructions into the computer system. The computer system also includes a communication unit, which enables the computer to connect to other servers and the Internet through an Input/Output (I/O) interface. The communication unit also enables the transfer as well as reception of data from other servers. The communication unit may include a modem, an Ethernet card, or any similar device which enable the computer system to connect to servers and networks such as Local Area Network (LAN), Metropolitan Area Network (MAN), Wide Area Network (WAN) and the Internet. The computer system facilitates inputs from a user through an input device, accessible to the system through an I/O interface.

The computer system executes a set of instructions that are stored in one or more storage elements, in order to process the input data. The storage elements may also hold data or other information as desired. The storage element may be in the form of an information source or a physical memory element present in the processing machine.

The present invention may also be embodied in a computer program product for managing one or more processes in a business process center. The computer program product includes a computer usable medium having a set program instructions comprising a program code for managing one or more processes in a business process center. The set of instructions may include various commands that instruct the processing machine to perform specific tasks such as the steps that constitute the method of the present invention. The set of instructions may be in the form of a software program. Further, the software may be in the form of a collection of separate programs, a program module with a large program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limit to these embodiments only. Numerous modifications, changes, variations, substitutions and equivalents will be apparent to those skilled in the art without departing from the spirit and scope of the invention, as described in the claims.

What is claimed is:

1. A system for managing one or more processes in a business process center, the system comprising:
   a. a client-host, the client-host configured for:
      displaying a plurality of applications in a single screen, the displayed applications being accessed by an agent for having access to critical information regarding a data transaction that is associated with at least one of the plurality of applications, wherein display order of the applications is based on preferences of the agent and the usage of the applications, further wherein the agent accesses the plurality of the applications using single log-in credentials, linking all the applications with each other that have common parameters so that the agent can access to all issue of applications related to that common parameter;

wherein the client-host comprises an information transfer module configured for enabling communication between the plurality of applications, the communication comprising transmitting the critical information related to the data transaction between the plurality of applications on the single screen;

b. an input module, the input module configured for entering one or more pre-defined data items into at least one of the plurality of applications, the one or more pre-defined data items being required for the data transaction and being entered by the agent; and c. a control module, the control module configured for recording the critical information of the data transaction for data analysis, wherein the data analysis enables managing one or more processes associated with the data transaction.

2. The system according to claim 1, wherein the control module is further configured for capturing at least one information associated with the agent, the at least one information being at least one of one or more personal information and one or more official information.

3. The system according to claim 1, wherein the business process center is at least one of front office and back office.

4. The system according to claim 1 further comprising a one click sign-in module configured for enabling one-click authentication of the agent for logging into the plurality of applications during the data transaction.

5. The system according to claim 4, wherein the one click sign-in module comprises an initial sign-in module configured for one-click authentication to initiate access to each of the plurality of applications.

6. The system according to claim 4, wherein the one click sign-in module comprises a repeat sign-in module configured for one-click authentication after expiration of existing log-in session of the agent.

7. The system according to claim 1, wherein the client-host comprises a linking module configured for creating the interface between the plurality of applications, the interfaced plurality of applications being displayed in a tabbed view on the single screen.

8. The system according to claim 1, wherein the client-host comprises a display module configured for displaying the critical information to the agent, the critical information being captured from a tabbed view of the plurality of applications.

9. The system according to claim 1, wherein the control module comprises an event tracker module configured for capturing one or more events of the data transaction.

10. The system according to claim 9, wherein the event tracker module is further configured for displaying the critical information to at least one of one or more process managers, one or more supervisors, one or more team leads and one or more quality executives.

11. The system according to claim 10, wherein the control module comprises a decision engine configured for deciding a common message to be sent to one or more agents based on the tracked one or more events in the business process center.

12. The system according to claim 1, wherein the control module comprises a data analytics module configured for performing data analysis on the critical information.

13. The system according to claim 1 further comprising an alert module configured for sending a common message to one or more agents of a business process center, the message being decided by a reviewer.

14. A method for managing one or more processes in a business process center, the method comprising:

a. displaying a plurality of applications in a single screen, the displayed applications being accessed by an agent, for having access to critical information regarding a data transaction that is associated with at least one of the plurality of applications, wherein display order of the applications is based on preferences of the agent and the usage of the applications, further wherein the agent accesses the plurality of the applications using single log-in credentials b. linking all the applications with each other that have common parameters so that the agent can access to all issue of applications related to that common parameter;

c. enabling communication between the plurality of applications, the communication comprising transmitting the critical information related to the data transaction between the plurality of applications on the single screen;

d. entering one or more pre-defined data items into at least one of the plurality of applications, the one or more pre-defined data items being required for the data transaction and being entered by the agent; and e. recording the critical information of the data transaction for data analysis, wherein the data analysis enables managing one or more processes associated with the data transaction.

15. The method according to claim 14, wherein the business process center is at least one of front office and back office.

16. The method according to claim 14 further comprising logging into the plurality of applications by the agent through one-click authentication of the agent.

17. The method according to claim 16, wherein the logging into the plurality of applications comprises one-click authentication to initiate access to each of the plurality of applications.

18. The method according to claim 16, wherein the logging into the plurality of applications comprises one-click authentication after expiration of existing log-in session of the agent.

19. The method according to claim 14, wherein displaying the plurality of applications in the single screen comprises creating the interface between the plurality of applications, the interfaced plurality of applications being displayed in a tabbed view on the single screen.

20. The method according to claim 14, wherein displaying the plurality of applications in the single screen comprises displaying the critical information to the agent, the critical information being captured from a tabbed view of the plurality of applications.

21. The method according to claim 14, wherein the recording of the critical information comprises capturing one or more events of the data transaction.

22. The method according to claim 14, wherein the recording of the critical information comprises displaying the critical information to one or more process managers.

23. The method according to claim 14, wherein the recording of the critical information comprises performing data analysis on the recorded critical information.

24. The method according to claim 14 further comprising capturing at least one information associated with the agent, the at least one information being at least one of one or more personal information and one or more official information.

25. A computer program product for use with a computer, the computer program product comprising a non-transitory computer usable storage device having a computer readable program code embodied therein for managing one or more processes in a business process center, the computer readable program code performing:
  a. displaying a plurality of applications in a single screen, the displayed applications being accessed by an agent, for having access to critical information regarding a data transaction that is associated with at least one of the plurality of applications, wherein display order of the applications is based on preferences of the agent and the usage of the applications, further wherein the agent accesses the plurality of the applications using single log-in credentials,
  b. linking all the applications with each other that have common parameters so that the agent can access to all issue of applications related to that common parameter;
  c. enabling communication between the plurality of applications, the communication comprising transmitting the critical information related to the data transaction between the plurality of applications on the single screen;
  d. entering one or more pre-defined data items into at least one of the plurality of applications, the one or more pre-defined data items being required for the data transaction and being entered by the agent; and
  e. recording the critical information of the data transaction for data analysis, wherein the data analysis enables managing one or more processes associated with the data transaction.

26. The computer program product according to claim 25, wherein the computer readable program code further performing logging into the plurality of applications by the agent through one-click authentication of the agent.

27. The computer program product according to claim 25, wherein the recording of the critical information comprises capturing one or more events of the data transaction.

28. The computer program product according to claim 25, wherein the recording of the critical information comprises displaying the critical information to one or more process managers.

29. The computer program product according to claim 25, wherein the recording of the critical information comprises performing data analysis on the recorded critical information.

* * * * *